(12) United States Patent
Batt

(10) Patent No.: US 9,862,066 B1
(45) Date of Patent: Jan. 9, 2018

(54) SYSTEMS AND METHODS FOR CONTROL OF FOREIGN OBJECT DEBRIS

(71) Applicant: The Boeing Company, Chicago, IL (US)

(72) Inventor: Edward John Batt, Ladson, SC (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/280,290

(22) Filed: Sep. 29, 2016

(51) Int. Cl.
| | |
|---|---|
| *B23B 45/14* | (2006.01) |
| *B23Q 11/00* | (2006.01) |
| *B23Q 3/06* | (2006.01) |
| *B23B 41/00* | (2006.01) |
| *B23B 47/34* | (2006.01) |
| *B25H 1/00* | (2006.01) |

(52) U.S. Cl.
CPC .......... *B23Q 11/0046* (2013.01); *B23B 41/00* (2013.01); *B23B 47/34* (2013.01); *B23Q 3/062* (2013.01); *B25H 1/0057* (2013.01); *B23B 2270/30* (2013.01); *B23B 2270/62* (2013.01); *Y10T 29/5118* (2015.01); *Y10T 408/50* (2015.01)

(58) Field of Classification Search
CPC  B23Q 3/062; B23Q 11/0046; B23Q 11/0042; B23Q 11/0075; B23B 47/34; B23B 2270/62; B23B 2270/30; B25H 1/0021; B25H 1/0057; B25H 1/0064; Y10T 408/50; Y10T 408/51; Y10T 29/5118
See application file for complete search history.

(56) References Cited

U.S. PATENT DOCUMENTS

| | | | | |
|---|---|---|---|---|
| 1,249,045 A | * | 12/1917 | Diffendall | B25H 1/0057 408/99 |
| 2,278,886 A | * | 4/1942 | Langbein | B23Q 11/10 184/103.1 |
| 2,978,791 A | * | 4/1961 | Clar | B21J 15/02 29/34 B |

(Continued)

FOREIGN PATENT DOCUMENTS

| | | | | |
|---|---|---|---|---|
| DE | 3019241 A1 | * | 11/1981 | B23B 31/00 |
| JP | 57184612 A | * | 11/1982 | B23B 35/00 |

(Continued)

OTHER PUBLICATIONS

Co-pending U.S. Appl. No. 15/205,734, filed Jul. 8, 2016.

*Primary Examiner* — Daniel Howell
(74) *Attorney, Agent, or Firm* — McDonnell Boehnen Hulbert & Berghoff LLP

(57) ABSTRACT

In an example, a clamp foot for a clamp assembly includes a housing having a distal end for engaging a workpiece, an aperture in the distal end of the housing, and a cavity in the housing extending proximally from the aperture. The clamp foot also includes a flapper in the cavity and adjacent to the distal end. The clamp foot further includes a pneumatic port in the cavity configured to direct a pneumatic force from a pneumatic source to the flapper, and a vacuum port in the cavity for coupling the cavity to a vacuum source. Responsive to the pneumatic force, the flapper is movable within the cavity to separate debris from the workpiece. The vacuum port is configured to remove from the cavity, via a vacuum force from the vacuum source, the debris separated from the workpiece by the flapper.

20 Claims, 9 Drawing Sheets

(56) References Cited

U.S. PATENT DOCUMENTS

| | | | | |
|---|---|---|---|---|
| 2,989,046 | A | * | 6/1961 | Zimmerman .......... B28D 1/041 408/1 R |
| 4,679,969 | A | * | 7/1987 | Riley ................... B25H 1/0057 408/103 |
| 4,948,308 | A | * | 8/1990 | Giannuzzi ............... B25B 5/061 408/103 |
| 5,333,973 | A | * | 8/1994 | Hoshino ................ B23Q 11/10 408/56 |
| 5,542,796 | A | * | 8/1996 | Bratten .................. B23B 41/00 29/897.2 |
| 5,593,256 | A | * | 1/1997 | Bielak .................... B23B 35/00 408/1 R |
| 5,888,032 | A | * | 3/1999 | Jensen .................. B23Q 35/02 408/1 R |
| 5,961,258 | A | * | 10/1999 | Ende ....................... B21J 15/10 408/100 |
| 6,283,684 | B1 | * | 9/2001 | Jarvis ................... B23B 39/003 408/103 |

FOREIGN PATENT DOCUMENTS

| | | | | |
|---|---|---|---|---|
| JP | 07051940 | A | * | 2/1995 |
| JP | 09117896 | A | * | 5/1997 ............. B23Q 11/10 |

\* cited by examiner

SYSTEMS AND METHODS FOR CONTROL OF FOREIGN OBJECT DEBRIS

FIELD

The present disclosure generally relates to manufacturing systems and methods, and more particularly to, systems and methods that provide for control of foreign object debris during manufacturing operations.

BACKGROUND

Unless otherwise indicated herein, the materials described in this section are not prior art to the claims and are not admitted to be prior art by inclusion in this section.

Foreign object debris (FOD) can be a safety and quality control concern in various environments such as, for example, aviation, aerospace, manufacturing, warehouse, and shipping environments. Indeed, in such environments, FOD may potentially cause damage to equipment, injury to personnel, and/or increased manufacturing expenses.

In general, FOD can be any object that is in a location at which it should not be. As one example, when a drill is used to form a bore in a workpiece, the drill may push a portion of the workpiece out of the bore on a back-side of the workpiece. This portion of the workpiece pushed out the back-side of the workpiece may be referred to as a "drill cap." In some instances, the drill cap may remain partially attached to the back-side of the workpiece. If a fastener is then inserted through the bore and coupled to the workpiece by a nut, the drill cap can become trapped between the workpiece and the nut. The trapped drill cap may compromise the integrity of the fastening and/or render the workpiece non-compliant with applicable manufacturing guidelines or regulations. Further, if the drill cap is later discovered during inspection, the manufacturer may be required to disassemble various components of a manufactured item to remove the drill cap from the workpiece.

SUMMARY

A method and system for control of FOD during manufacturing operations is disclosed. In an example, a clamp foot for a clamp assembly includes a housing having a distal end for engaging a workpiece, an aperture in the distal end of the housing, and a cavity in the housing extending proximally from the aperture. The clamp foot also includes a flapper in the cavity and adjacent to the distal end. The clamp foot further includes a pneumatic port in the cavity configured to direct a pneumatic force from a pneumatic source to the flapper, and a vacuum port in the cavity for coupling the cavity to a vacuum source. Responsive to the pneumatic force, the flapper is movable within the cavity to separate debris from the workpiece. The vacuum port is configured to remove from the cavity, via a vacuum force from the vacuum source, the debris separated from the workpiece by the flapper.

In another example, a clamp assembly includes a clamp foot, a clamp frame, and an end-effector. The clamp foot includes a housing having a distal end for engaging a workpiece, an aperture in the distal end of the housing, a cavity in the housing extending proximally from the aperture, a flapper in the cavity and adjacent to the distal end, a pneumatic port in the cavity configured to direct a pneumatic force from a pneumatic source to the flapper, and a vacuum port in the cavity for coupling the cavity to a vacuum source. The clamp frame has a first end coupled to the clamp foot. The end-effector is coupled to a second end of the clamp frame. The end-effector has a drill including a cutting element and the cutting element is aligned with the aperture in the clamp foot. Responsive to the pneumatic force, the flapper is movable within the cavity to separate debris from the workpiece. The vacuum port is configured to remove from the cavity, via a vacuum force from the vacuum source, the debris separated from the workpiece by the flapper.

In another example, a method includes clamping a workpiece between an end-effector and a clamp foot of a clamp assembly. The clamp foot includes a housing having a distal end engaging the workpiece, an aperture in the distal end of the housing, a cavity in the housing extending proximally from the aperture, and a flapper in the cavity and adjacent to the distal end. The method also includes applying, from a vacuum source, a vacuum force in the cavity of the clamp foot, and drilling a bore in the workpiece using a cutting element of the end-effector. After drilling the bore, the method includes removing the cutting element of the end-effector from the bore. The method further includes, while removing the cutting element of the end-effector from the bore, moving the flapper in the cavity to separate debris from the workpiece, and removing the debris from the cavity using the vacuum force.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings.

DETAILED DESCRIPTION

I. Overview

Figure 1:
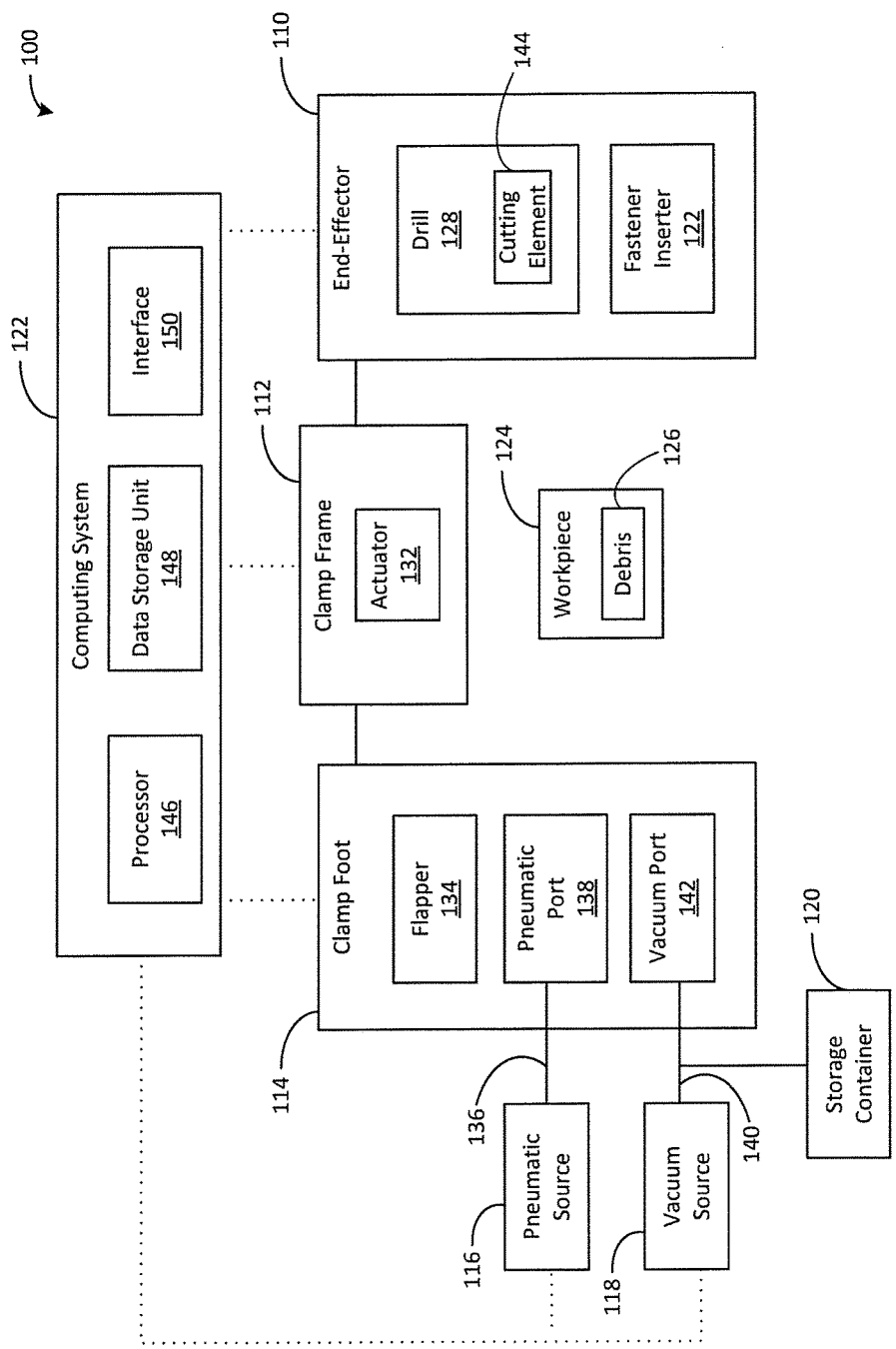
FIG. 1 depicts a simplified block diagram of a clamp assembly according to an example embodiment.

The methods and systems of the present disclosure provide for manufacturing systems and methods, and more particularly to, systems and methods that provide for FOD control during manufacturing operations. Within examples, a workpiece can be clamped between an end-effector and a clamp foot of a clamp assembly. The end-effector can be configured to perform one or more manufacturing operations on the workpiece such as, for example, drilling a bore in the workpiece and/or coupling a fastener in the bore. The clamp foot can provide support to a back-side of the workpiece while the end-effector operates on a front-side of the workpiece.

The manufacturing operations performed by the end-effector on the workpiece may cause debris to form on the back-side of the workpiece. For example, when the end-effector drills a bore in the workpiece, the end-effector may push a portion of the workpiece out of the bore on the back-side of the workpiece. This portion of the workpiece pushed out the back-side of the workpiece can be referred to as a "drill cap." In some instances, debris such as a drill cap may remain partially attached to the back-side of the workpiece.

The clamp foot can beneficially facilitate separating and removing debris, such as a drill cap, from the workpiece. To do so, the clamp foot includes a cavity in which a flapper can move. In particular, the flapper can move to strike the debris and thereby separate the debris from the workpiece. Once separated from the workpiece, the clamp foot can use a vacuum source to remove the debris away from the workpiece. For instance, the vacuum source can apply a vacuum force in the cavity to suck the debris through a vacuum port into a vacuum conduit, and transport the debris away from the clamp foot to a storage container. The systems and methods of the present disclosure can thus advantageously reduce (or eliminate) problems associated with FOD resulting from manufacturing operations.

In an aspect, the clamp assembly can be controlled to actuate the flapper so as to mitigate or avoid contact between the flapper and the end-effector. For example, a computing system can receive information regarding a position of a cutting element of the end-effector and, based on the position of the cutting element, the computing system can cause the flapper to move. For instance, the computing system can cause a pneumatic source to actuate the flapper so that the flapper moves to strike the debris while the cutting element is being removed from the bore. The flapper can operate rapidly while the cutting element of the end-effector is withdrawing from the bore and, thus, the systems and methods of the present disclosure can beneficially control FOD with little or no impact on the speed of performing manufacturing operations on the workpiece.

Further, by reducing or eliminating the risk of FOD, the systems and methods of the present disclosure can increase manufacturing quality and efficiency, while lowering manufacturing costs and downtime.

II. Example Systems

FIG. 1 depicts a simplified block diagram according to an example embodiment. As shown in FIG. 1, the clamp assembly 100 includes an end-effector 110, a clamp frame 112, a clamp foot 114, a pneumatic source 116, a vacuum source 118, a storage container 120, and a computing system 122. FIG. 1 also shows an example workpiece 124 having debris 126 formed as a result of a manufacturing operation on the workpiece 124. Within examples, the workpiece 124 can be one or more structural components of a device and/or a system to be manufactured, at least in part, by the clamp assembly 100.

The end-effector 110 can interact with the workpiece 124 to perform one or more operations on the workpiece 124. The end-effector 110 can take a number of different forms depending on the type(s) of operation(s) that are to be performed on the workpiece 124 by the clamp assembly 100. In an example, the end-effector 110 can be a multi-function end-effector (MFEE) that is configured to form a bore in a workpiece 124 and couple a fastener in the bore. For instance, in FIG. 1, the end-effector 110 includes a drill 128 having a cutting element 144 for forming a bore in the workpiece 124 and a fastener inserter 130 for coupling a fastener in the bore. The cutting element 144 can be a drill bit, a countersink, a counter-bore, a tap and die, a milling cutter, and/or a reamer. The end-effector 110 can include additional or alternative tools for performing similar and/or different operations in further examples.

The clamp frame 112 can couple the clamp assembly 100 to a movable robot arm and/or another support structure (e.g., a non-movable base). The clamp frame 112 can also couple the end-effector 110 to the clamp foot 114 such that the workpiece 124 can be clamped between the end-effector 110 and the clamp foot 114. For example, the clamp frame 112 can include one or more actuators 132 that can move one or more portions of the clamp frame 112 relative to another portion of the clamp frame 112 to facilitate clamping the workpiece 124 between the end-effector 110 and the clamp foot 114, as will be described in further detail below.

In one aspect, when the workpiece 124 is clamped between the end-effector 110 and the clamp foot 114, the clamp foot 114 can provide support to inhibit (or prevent) movement of the workpiece 124 while the end-effector 110 operates on the workpiece 124. In another aspect, the clamp foot 114 can facilitate separating and removing debris 126 from the workpiece 124, which may form as a result of the end-effector 110 operating on the workpiece 124. As an example, the debris 126 can be a drill cap formed as a result of the end-effector 110 drilling a bore in the workpiece 124.

To separate the debris 126 from the workpiece 124, the clamp foot 114 includes a flapper 134 that is movable to strike the debris 126 on the workpiece 124. The flapper 134 can be movable responsive to a pneumatic force generated by the pneumatic source 116. For example, a pneumatic conduit 136 can couple the pneumatic source 116 to a pneumatic port 138 in the clamp foot 114. In this arrangement, the pneumatic port 138 can direct the pneumatic force to an exterior surface of the flapper 134 to move the flapper 134 and thereby separate the debris 126 from the workpiece 124.

After separating the debris 126 from the workpiece 124, the clamp foot 114 can remove the debris 126 using the vacuum source 118. For example, as shown in FIG. 1, a vacuum conduit 140 can couple the vacuum source 118 to a vacuum port 142 in the clamp foot 114 to facilitate the vacuum source 118 applying a vacuum force to the debris 126. As also shown in FIG. 1, the vacuum conduit 140 can further couple the vacuum port 142 of the clamp foot 114 to the storage container 120 so that the debris 126 can be transported, under the vacuum force, through the vacuum conduit 140 from the clamp foot 114 to the storage container 120. The storage container 120 can be configured to store a plurality of debris 126 items in an enclosed or partially enclosed environment. In this way, the storage container 120 can assist in (i) mitigating the risk of the debris 126 becoming FOD in an article incorporating the workpiece 124 and/or (ii) disposing or recycling of debris 126 removed from the workpiece 124.

The computing system 122 can process information and control aspects of the clamp assembly 100. The computing system 122 thus can be communicatively coupled to the end-effector 110, the clamp frame 112, the clamp foot 114, the pneumatic source 116, and/or the vacuum source 118. In one example, the computing system 122 can determine a position of the drill 128 relative to the workpiece 124 and, based on the position of the drill 128, the computing system 122 can actuate the pneumatic source 116 to move the flapper 134. In particular, for instance, the computing system 122 can actuate the pneumatic source 116 responsive to the computing system 122 determining that the end-effector 110 is removing the drill 128 from the bore in the workpiece 124. This can facilitate mitigating or avoiding the flapper 134 contacting the drill 128 as the flapper 134 moves to separate the debris 126 from the workpiece 124.

As another example, the computing system 122 can control the actuator 132 to cause the clamp frame 112 to move the clamp foot 114 relative to the end-effector 110, and thereby clamp and/or release the workpiece 124 between the clamp foot 114 and the end-effector 110. The computing system 122 can further control operation of the vacuum source 118 and/or the end-effector 110 as described further below.

As shown in FIG. 1, the computing system 122 can include one or more processors 146 and/or one or more data storage units 148. The processors 146 can be implemented as a combination of hardware and software elements. The hardware elements may include combinations of operatively coupled hardware components, including microprocessors, communication/networking interfaces, memory, signal filters, circuitry, etc. The processors 146 can be configured to perform operations specified by the software elements, e.g., computer-executable code stored on computer readable medium. The processors 146 can be implemented in any device, system, or subsystem to provide functionality and operation according to the present disclosure. The processors 146 can be implemented in any number of physical devices/machines. For example, the computing system 122 can include one or more shared or dedicated general purpose computer systems/servers. Indeed, parts of the processing of the example embodiments can be distributed over any combination of processors for better performance, reliability, cost, etc.

The physical devices/machines can be implemented by the preparation of integrated circuits or by interconnecting an appropriate network of component circuits, as is appreciated by those skilled in the electrical art(s). The physical devices/machines, for example, may include field programmable gate arrays (FPGA's), application-specific integrated circuits (ASIC's), digital signal processors (DSP's), etc. The physical devices/machines may reside on a wired or wireless network, e.g., LAN, WAN, Internet, cloud, near-field communications, etc., to communicate with each other and/or other systems, e.g., Internet/web resources.

Appropriate software can be readily prepared by programmers of ordinary skill based on the teachings of the example embodiments, as is appreciated by those skilled in the software arts. Thus, the example embodiments are not limited to any specific combination of hardware circuitry and/or software. Stored on one computer readable medium or a combination of computer readable media of the data storage unit 148, the computing system 122 may include software for controlling the devices and subsystems of the example embodiments, for driving the devices and subsystems of the example embodiments, for enabling the devices and subsystems of the example embodiments to interact with a human user (user interfaces, displays, controls), etc. Such software can include, but is not limited to, device drivers, operating systems, development tools, applications software, etc. A computer readable medium further can include the computer program product(s) for performing all or a portion of the processing performed by the example embodiments. Computer program products employed by the example embodiments can include any suitable interpretable or executable code mechanism, including but not limited to complete executable programs, interpretable programs, scripts, dynamic link libraries (DLLs), applets, etc. The processors 146 may include, or be otherwise combined with, computer-readable media. Some forms of computer-readable media may include, for example, a hard disk, any other suitable magnetic medium, CD-ROM, CDRW, DVD, any other suitable optical medium, RAM, PROM, EPROM, FLASH-EPROM, any other suitable memory chip or cartridge, a carrier wave, or any other suitable medium from which a computer can read.

As also shown in FIG. 1, the computing system 122 can include a communication interface 150. The communication interface 150 can allow the computing system 122 to connect to and/or communicate with another entity according to one or more protocols. In one example, communication interface 150 can be a wired interface, such as an Ethernet interface, a fiber optic interface, or a high-definition serial-digital-interface (HD-SDI). In another example, communication interface 150 can be a wireless interface, such as a cellular or WI-FI interface.

Figure 2A:
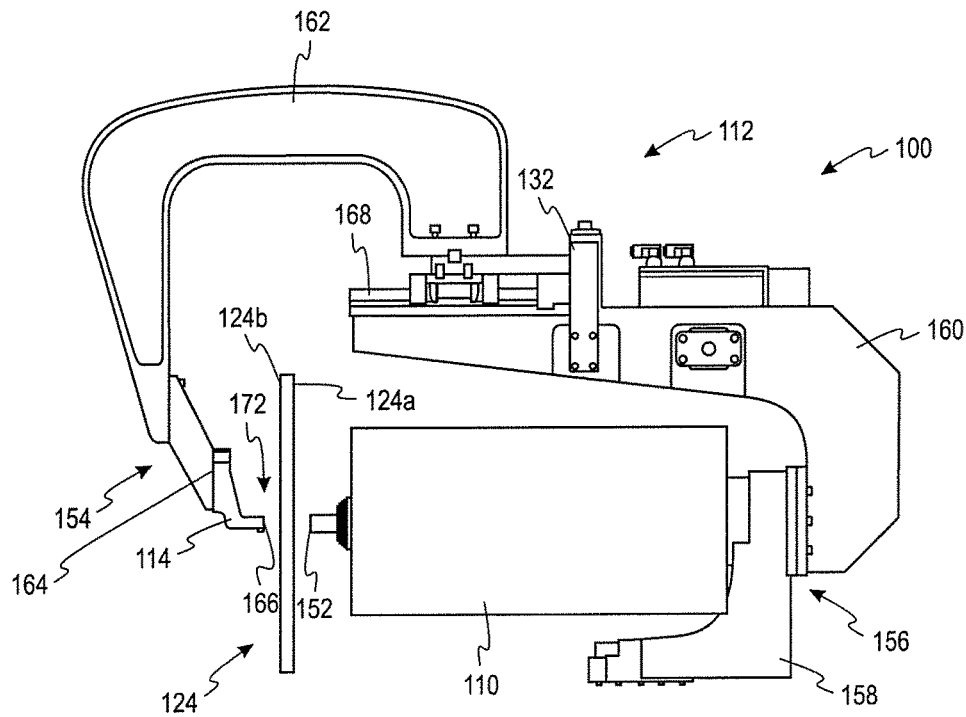
FIG. 2A depicts a side elevation view of the clamp assembly according to an example embodiment.
Figure 2B:
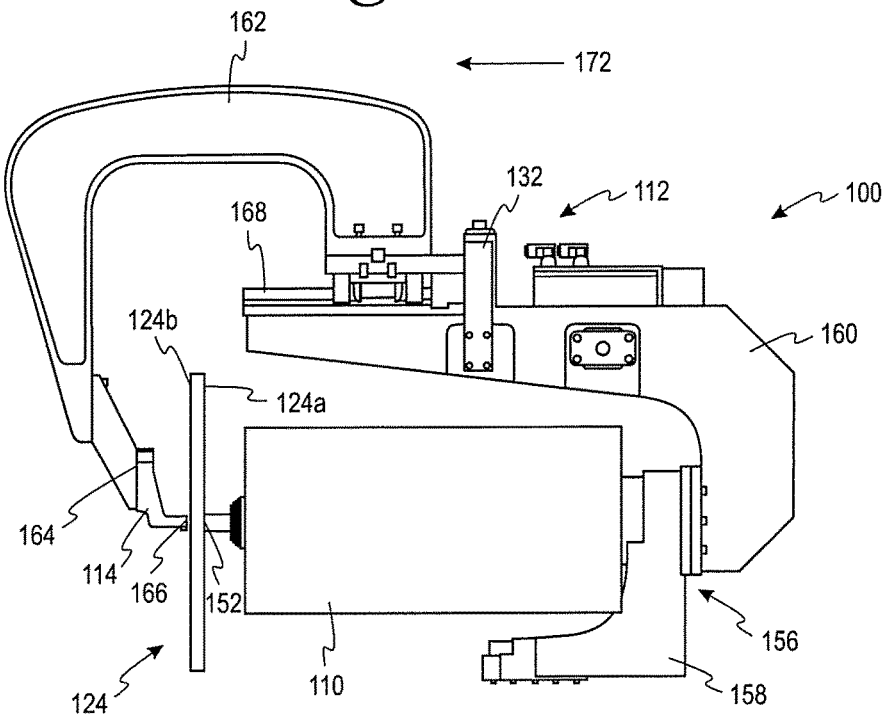
FIG. 2B depicts another side elevation view of the clamp assembly according to an example embodiment.

FIGS. 2A-2B depict side elevation views of the clamp assembly 100 and the workpiece 124 according to an example embodiment. As shown in FIGS. 2A-2B, the end-effector 110 includes an engagement end 152 at which the drill 128 and the fastener inserter 130 can operate on a front-side 124A of the workpiece 124. For example, the cutting element 144 of the drill 128 and/or the fastener inserter 130 can be at the engagement end 152 of the end-effector 110.

As also shown in FIGS. 2A-2B, the clamp foot 114 is coupled to a first end 154 of the clamp frame 112 and the end-effector 110 is coupled to a second end 156 of the clamp frame 112. The clamp assembly 100 also includes a clamp-frame support 158 coupled to the second end 156 of the clamp frame 112. The clamp-frame support 158 is configured to couple the clamp assembly 100 to a support structure (not shown) such as, for example, a movable robot arm and/or a non-movable base.

The clamp frame 112 includes a clamp-frame bracket 160, a clamp-frame arm 162, and the actuator 132. The clamp-frame bracket 160 is coupled to the clamp-frame support 158 and the end-effector 110 at the second end 156 of the clamp frame 112. The clamp-frame bracket 160 is further coupled to the clamp-frame arm 162, and the clamp-frame arm 162 is coupled to a proximal end 164 of the clamp foot 114. The clamp foot 114 also has a distal end 166 for engaging the workpiece 124. The distal end 166 of the clamp foot 114 can thus provide a surface for supporting a back-side 124B of the workpiece 124 while the end-effector 110 operates on the front-side 124A of the workpiece 124.

Within examples, the clamp-frame arm 162 is movably coupled to the clamp-frame bracket 160 to facilitate clamping and releasing the workpiece 124 between the distal end 166 of the clamp foot 114 and the engagement end 152 of the end-effector 110. For instance, in FIGS. 2A-2B, the clamp-frame arm 162 is slidably coupled to a track 168 on the clamp-frame bracket 160. The track 168 can thus guide the relative movement between the clamp-frame arm 162 and the clamp-frame bracket 160 along a predetermined path.

The actuator 132 is coupled to the clamp-frame arm 162 and the clamp-frame bracket 160 to facilitate moving the clamp-frame arm 162 relative to the clamp-frame bracket 160. For example, the actuator 132 can include one or more mechanical actuators, hydraulic actuators, pneumatic actuators, piezoelectric actuators, electro-mechanical actuators, and/or linear motors that can move the clamp-frame arm 162 along the track 168 on the clamp-frame bracket 160. The actuator 132 can thus controllably move the clamp-frame arm 162 relative to the clamp-frame bracket 160 to facilitate clamping the workpiece 124 between the clamp foot 114 and the end-effector 110.

In FIGS. 2A-2B, the workpiece 124 is positioned in a gap 170 between the distal end 166 of the clamp foot 114 and the engagement end 152 of the end-effector 110 with the front-side 124A facing the end-effector 110 and the back-side 124B facing the clamp foot 114. In FIG. 2A, the clamp-frame arm 162 is in a first position relative to the clamp-frame bracket 160. At the first position, the gap 170 is greater than a width of the workpiece 124. The first position can thus facilitate inserting the workpiece 124 between the clamp foot 114 and the end-effector 110 before operating on the workpiece 124 and/or removing the workpiece 124 from the clamp assembly 100 after operating on the workpiece 124.

To clamp the workpiece 124 between the distal end 166 of the clamp foot 114 and the engagement end 152 of the end-effector 110, the actuator 132 causes the clamp-frame arm 162 to move in a direction indicated by arrow 172 to a second position at which the distal end 166 of the clamp foot 114 engages the back-side 124B of the workpiece 124 and the engagement end 152 of the end-effector 110 engages the front-side 124A of the workpiece 124.

FIG. 2B depicts the workpiece 124 with the clamp-frame arm 162 in the second position on the clamp-frame bracket 160. As shown in FIG. 2B, the workpiece 124 is clamped between the distal end 166 of the clamp foot 114 and the engagement end 152 of the end-effector 110. Thus, in the second position, the clamp foot 114 and the end-effector 110 can beneficially apply a pressure to the workpiece 124 to inhibit (or prevent) movement of the workpiece 124 while the end-effector 110 operates on the workpiece 124. After the end-effector 110 completes the operation on the workpiece 124, the actuator 132 can move the clamp-frame arm 162 back from the second position to the first position so that the workpiece 124 can be removed from the clamp assembly 100 or repositioned relative to the clamp assembly 100.

In an example, the computing system 122 can receive information relating to the pressure applied by the clamp foot 114 and/or the end-effector 110 to the workpiece 124 and, based on the received information, the computing system 122 can control the actuator 132. For instance, the clamp assembly 100 can include one or more sensors (not shown) in the end-effector 110, the clamp frame 112, and/or the clamp foot 114, which can determine the pressure applied to the workpiece 124 and provide a signal indicative of the determined pressure to the computing system 122. In one implementation, the computing system 122 can cause the actuator 132 to move the clamp-frame arm 162 in the direction of the arrow 172 until the determined pressure reaches a predetermined value. In this way, the clamp assembly 100 can achieve a clamping pressure on the workpiece 124 by the clamp foot 114 and the end-effector 110 that can facilitate stably supporting the workpiece 124 while the end-effector 110 operates on the workpiece 124. Additionally, for example, using the computing system 122 to achieve a pressure at the predetermined value can help mitigate damage to the workpiece 124 from excessive pressure on the workpiece 124.

Figure 3:
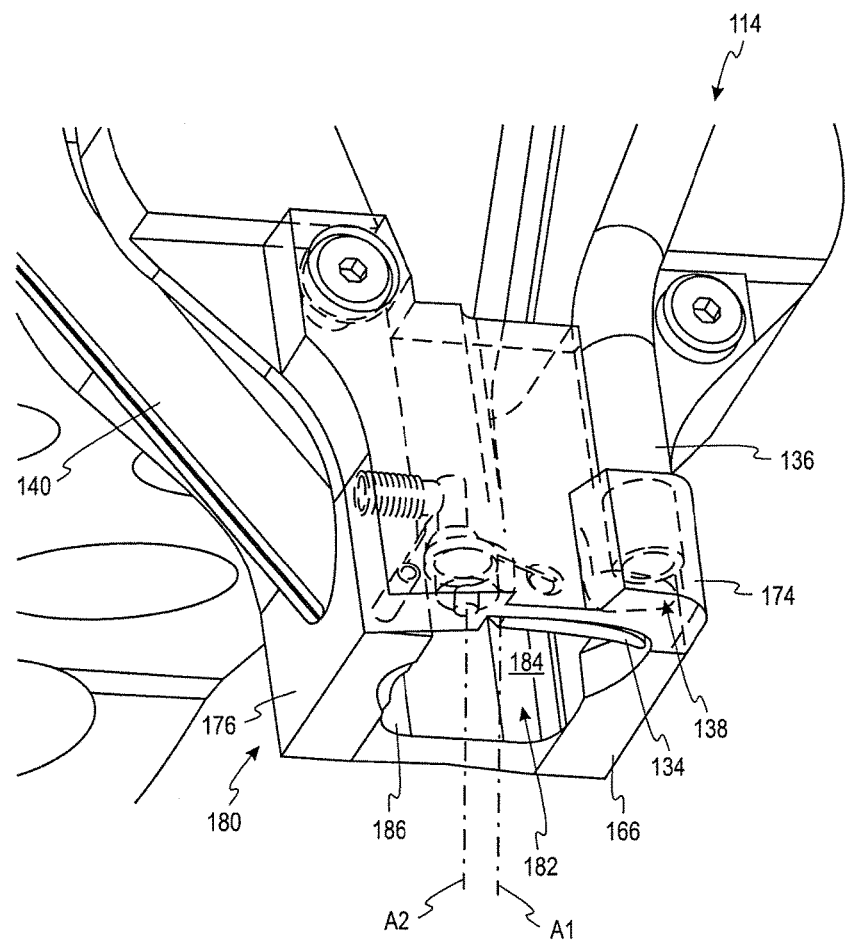
FIG. 3 depicts a perspective view of a distal end of the clamp foot according to an example embodiment.
Figure 4:
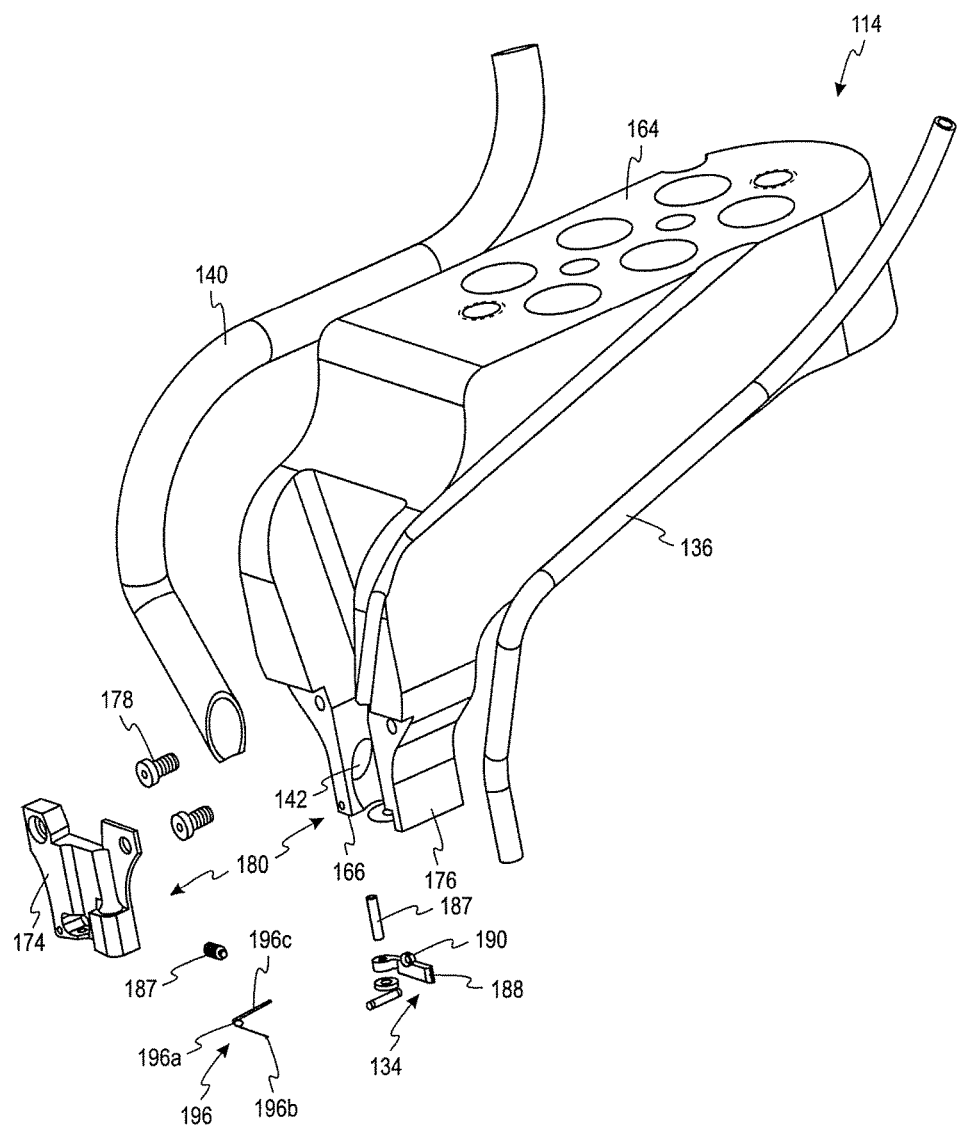
FIG. 4 depicts an exploded view of the clamp foot according to an example embodiment.

In addition to providing support to the workpiece 124, the clamp foot 114 can further provide for separating and/or removing debris 126 from the workpiece 124, which may form as a result of the end-effector 110 operating on the workpiece 124. FIGS. 3-4 depict additional aspects of the clamp foot 114 according to an example embodiment. In particular, FIG. 3 depicts a perspective view of the clamp foot 114 and FIG. 4 depicts an exploded view of the clamp foot 114.

As shown in FIGS. 3-4, the clamp foot 114 includes a cover portion 174 and a body portion 176. As shown in FIG. 3, the cover portion 174 can be coupled to the body portion 176 (e.g., by one or more screws 178) to form a housing 180 of the clamp foot 114. In another example, the cover portion 174 can be integrally formed with the body portion 176 to provide the housing 180 as a one-piece construction. However, removably coupling the cover portion 174 to the body portion 176 can beneficially facilitate installing, servicing, and/or repairing various internal components (e.g., the flapper 134) of the clamp foot 114 with greater ease.

The housing 180 extends between the proximal end 164 of the clamp foot 114 and the distal end 166 of the clamp foot 114. As shown in FIG. 3, with the cover portion 174 coupled to the body portion 176, the housing 180 includes an aperture 182 in the distal end 166. The cover portion 174 and the body portion 176 further define a cavity 184 in the housing 180 extending proximally from the aperture 182 at the distal end 166. In particular, the cover portion 174 and the body portion 176 define a plurality of side walls 186 of the cavity 184.

The aperture 182 in the housing 180 of the clamp foot 114 can be aligned with the cutting element 144 (e.g., drill bit) for the drill 128 of the end-effector 110. Further, the aperture 182 can have cross-sectional dimensions that are greater than corresponding dimensions of the cutting element 144 of the drill 128. Due to this alignment and dimensioning, the debris 126 formed on the back-side 124B of the workpiece 124 can extend from the back-side 124B of the workpiece 124 into the cavity 184 of the clamp foot 114.

In line with the discussion above, the clamp foot 114 includes the flapper 134, which is movable in the cavity 184 to separate the debris 126 extending from the back-side 124B of the workpiece 124 into the cavity 184. The flapper 134 includes a blade portion 188 that is configured to contact and thereby separate the debris 126 from the workpiece 124 when the flapper 134 moves in the cavity 184. To facilitate the blade portion 188 separating the debris 126, the blade portion 188 can be made from a relatively hard material (e.g., compared to a material of the workpiece 124) such as, for example, pre-hardened steel, chrome-plated steel, surface-nitrided titanium, combinations thereof, and/or the like. Although the flapper 134 is an elongated structure having a blade portion 188 in the illustrated example, the flapper 134 can have a different shape in further examples. More generally, the flapper 134 is a structure that can move in the cavity 184 to contact and separate the debris 126 from the workpiece 124.

As shown in FIG. 3, the flapper 134 can be coupled to the housing 180 in the cavity 184 and adjacent to the distal end 166. By the term "adjacent to," it is meant that the flapper 134 is (i) near the distal end 166 and (ii) proximally offset from the distal end 166 by a distance that is sufficient to allow the flapper 134 to strike the debris 126 in the cavity 184 without the flapper 134 contacting the remainder of the back-side 124B of the workpiece 124 when the flapper 134 moves in the cavity 184. In one example, the flapper 134 can be proximally offset from the distal end 166 by a distance of approximately 0.005 inches to approximately 0.030 inches (i.e., approximately 0.127 mm to approximately 0.762 mm). By reducing or eliminating contact between the flapper 134 and the back-side 124B of the workpiece 124 when the flapper 134 moves to strike the debris 126, the risk of the flapper 134 damaging the workpiece 124 is reduced or eliminated.

The flapper 134 can be hingedly coupled to the housing 180, for instance, by one or more screws 187. As an example, the screw(s) 187 can include a dog point set screw. As shown in FIG. 3, the aperture 182 can have a first axis A1 and the flapper 134 can be hingedly coupled to the housing 180 such that the flapper 134 is rotatable about a second axis A2 that is substantially parallel to the first axis A1 of the aperture 182. In this arrangement, the flapper 134 can be configured to move through a plane that is parallel to a plane of the distal end 166. This can further reduce or eliminate the risk of the flapper 134 contacting the back-side 124B of the workpiece 124 while moving the flapper 134 in the cavity 184 and, thus, reduce or eliminate the risk of damage to the workpiece 124 from the flapper 134 movement.

As described above, the flapper 134 is movable responsive to a pneumatic force applied to the flapper 134. In particular, the pneumatic source 116 is configured to compress a gas to generate the pneumatic force. The pneumatic conduit 136 can transport the compressed gas from the pneumatic source 116 to the pneumatic port 138 in the clamp foot 114. The pneumatic port 138 receives the compressed gas from the pneumatic conduit 136 and directs the compressed gas to an exterior surface of the flapper 134. The pneumatic port 138 thus applies the pneumatic force, which is generated by the pneumatic source 116, to the flapper 134 and the flapper 134 rotates about the axis A2 responsive to the pneumatic force.

The pneumatic force can be of a magnitude that facilitates moving the flapper 134 with sufficient force to separate the debris 126 from the workpiece 124. In an example, the pneumatic force applied to the flapper 134 can be approximately 40 psi to approximately 100 psi. In another example, the pneumatic force applied to the flapper 134 can be approximately 90 psi.

Figure 5A:
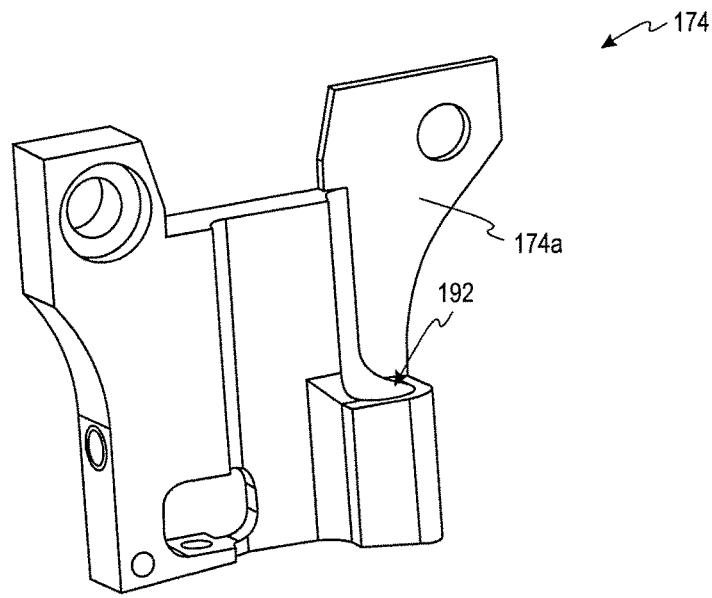
FIG. 5A depicts a perspective view of a cover portion of the clamp foot according to an example embodiment.
Figure 5B:
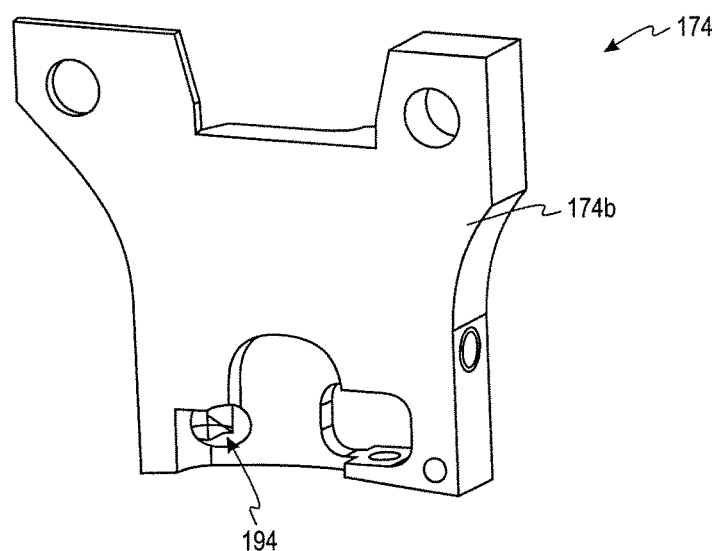
FIG. 5B depicts another perspective view of the cover portion of the clamp foot according to an example embodiment.

As shown in FIG. 3, the pneumatic port 138 can be in the cover portion 174 of the housing 180. FIGS. 5A-5B depict perspective views of the cover portion 174 to further show the pneumatic port 138 according to an example embodiment. As shown in FIG. 5A, the pneumatic port 138 includes an inlet 192 for receiving the compressed air from the pneumatic conduit 136 on an outer surface 174A of the cover portion 174. As shown in FIG. 5B, the pneumatic port 138 also includes an outlet 194 on an inner surface 174B of the cover portion 174 for providing the compressed gas to the exterior surface of the flapper 134.

In FIGS. 5A-5B, the outlet 194 is oriented at an approximately 90 degree angle relative to the inlet 192. More generally, the outlet 194 can be orientated at an angle relative to the inlet 192 that facilitates efficiently applying the pneumatic force to the flapper 134. For example, the outlet 194 can be oriented so that the pneumatic force is perpendicular to the exterior surface of the flapper 134. By providing a pneumatic port 138 with an outlet 194 at an angle relative to the inlet 192, there can be greater flexibility in the manner in which the pneumatic conduit 136 is coupled to the clamp foot 114.

Referring back to FIGS. 3-4, the flapper 134 can include a flange portion 190 extending from the blade portion 188. The flange portion 190 can provide increased surface area on the exterior surface of the flapper 134 for receiving the pneumatic force. As such, the flange portion 190 can enhance the efficiency of the flapper 134 moving responsive to the pneumatic force applied to the flapper 134.

Figure 6A:
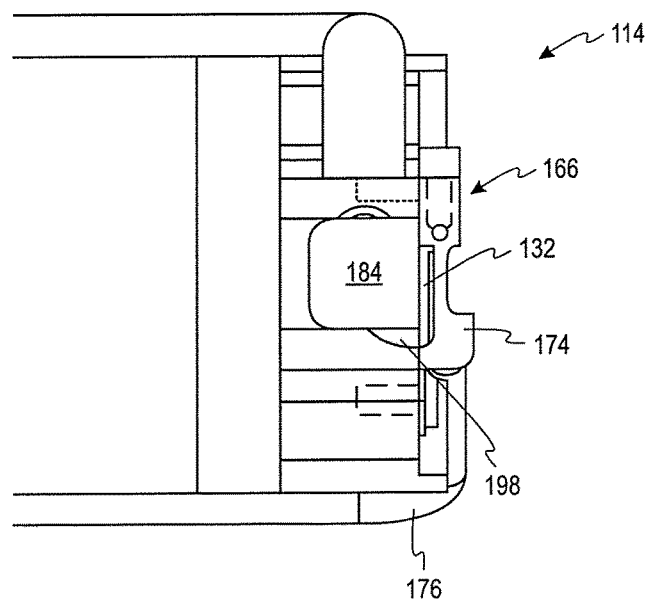
FIG. 6A depicts a side view of the clamp foot according to an example embodiment.
Figure 6B:
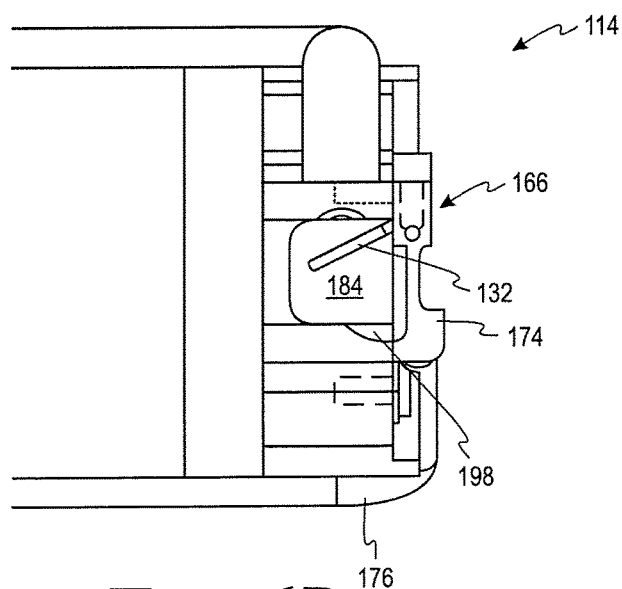
FIG. 6B depicts another side view of the clamp foot according to an example embodiment.

FIGS. 6A-6B depict a side view of the clamp foot 114 according to an example embodiment. As shown in FIGS. 6A-6B, the body portion 176 can include a cutout portion 198 at the distal end 166 to accommodate the flapper 134 moving in the cavity 184. In FIG. 6A, the flapper 134 is in a first position in the cavity 184. Responsive to the pneumatic force on the flapper 134, the flapper 134 rotates about the axis A2 and thereby moves in the cavity 184 to a second position. FIG. 6B depicts the flapper 134 in the second position. As shown in FIGS. 6A-6B, the flapper 134 can move by sweeping through a plane that is parallel to a plane of the distal end 166.

Referring back to FIGS. 3-4, the clamp foot 114 can further include a biasing member 196 for applying a biasing force to the flapper 134. In particular, the biasing member 196 can bias the flapper 134 in a direction from the second position (shown in FIG. 6B) to the first position (shown in FIG. 6A). In this way, the biasing member 196 is configured to return the flapper 134 from the second position to the first position in response to a cessation of the pneumatic force on the flapper 134.

In the example of FIGS. 3-4, the biasing member 196 is a torsion spring. The torsion spring includes a coil 196A, a first arm 196B extending from the coil 196A to engage the flapper 134, and a second arm 196C extending from the coil 196A to engage the housing 180. The biasing member 196 can take a different form in further examples.

Also, in line with the discussion above, the clamp foot 114 includes a vacuum port 142 to apply a vacuum force to the debris 126 and thereby remove the debris 126 from the clamp foot 114. The vacuum source 118 is configured to generate the vacuum force. For example, the vacuum source 118 can generate the vacuum force in the form of a negative pressure. The vacuum conduit 140 couples the vacuum source 118 to the vacuum port 142. As shown in FIG. 4, the vacuum port 142 can be in the body portion 176 of the housing 180. As such, the vacuum force generated by the vacuum force can be applied to the cavity 184 via the vacuum port 142. The vacuum force is generally directed from the aperture 182 in the housing 180 to the vacuum port 142 and then along the vacuum conduit 140.

When the debris 126 is separated from the workpiece 124 (e.g., by the flapper 134), the debris 126 is sucked into the vacuum port 142 by the vacuum force in the cavity 184. The vacuum port 142 can have a size and shape that allow the debris 126 to pass through the vacuum port 142 from the cavity 184 to the vacuum conduit 140. In the illustrated example, the vacuum port 142 is located in the housing 180 such that the flapper 134 forces the debris toward the vacuum port 142 when the flapper 134 strikes the debris 126. This is achieved by the flapper 134 being configured to move toward the vacuum port 142 as the flapper 134 moves from the first position (shown in FIG. 6A) to the second position (shown in FIG. 6B). Arranging the flapper 134 and vacuum port 142 in this manner can facilitate directing the debris 126 into the vacuum port 142 and thereby removing the debris 126 from the clamp foot 114.

After the debris 126 passes through the vacuum port 142, the vacuum force transports the debris 126 along the vacuum conduit 140 to the storage container 120. The storage container 120 can receive and store one or more debris 126 items. By removing the debris 126 from the workpiece 124 to a separate storage container 120, the clamp assembly 100 can reduce or eliminate a risk that the debris 126 will become FOD.

III. Example Operations

In operation, the workpiece 124 is positioned in the gap 170 between the end-effector 110 and the clamp foot 114. After the workpiece 124 is positioned between the end-effector 110 and the clamp foot 114, the actuator 132 moves the clamp-frame arm 162 along the track 168 of the clamp-frame bracket 160 until the workpiece 124 is clamped between the distal end 166 of the clamp foot 114 and the engagement end 152 of the end-effector 110. In this arrangement, the clamp foot 114 thus provides support to the back-side 124B of the workpiece 124.

In an example, the computing system 122 can control the actuator 132 based, at least in part, on information relating to a pressure applied to the workpiece 124 by the distal end 166 and/or the engagement end 152. For instance, one or more sensors can determine the pressure applied to the workpiece 124 and provide to the computing system 122 a signal indicative of the determined pressure. Based on the determined pressure indicated by the signal, the computing system 122 can cause the actuator 132 to move the clamp-frame arm 162 in the direction of the arrow 172 until the determined pressure reaches a predetermined value. In this way, the clamp assembly 100 can achieve a clamping pressure on the workpiece 124 by the clamp foot 114 and the end-effector 110 that can facilitate stably supporting the workpiece 124 while the end-effector 110 operates on the workpiece 124.

After the workpiece 124 is clamped between the end-effector 110 and the clamp foot 114, the vacuum source 118 generates the vacuum force, which is applied to the cavity 184 via the vacuum conduit 140 and the vacuum port 142 in the clamp foot 114. In an example, the computing system 122 can provide a signal to the vacuum source 118 to activate the vacuum source 118. For instance, the computing system 122 can activate the vacuum source 118 responsive to the computing system 122 determining that the predetermined pressure has been achieved for clamping the workpiece 124 between the clamp foot 114 and the end-effector 110. In some instances, the vacuum force can further assist in stably supporting the back-side 124B of the workpiece 124 on the distal end 166 of the clamp foot 114.

The end-effector 110 can then use the drill 128 to drill a bore in the workpiece 124 from the front-side 124A to the back-side 124B. During the end-effector 110 drilling the bore, debris 126 such as a drill cap may be formed on the back-side 124B of the workpiece 124. The debris 126 may protrude from the back-side 124B of the workpiece 124 into the cavity 184 of the clamp foot 114 via the aperture 182 in the clamp foot 114.

To complete the bore in the workpiece 124, the cutting element 144 of the end-effector 110 can penetrate through and extend past the back-side 124B of the workpiece 124. As one example, the cutting element 144 of the drill 128 can extend past the back-side 124B by approximately 0.010 inches to approximately 0.030 inches (i.e., approximately 0.254 mm to approximately 0.762 mm). In an implementation, the cutting element 144 can be retracted back toward the front-side 124A of the workpiece relatively quickly after the cutting element 144 penetrates through the back-side 124B so as to reduce (or minimize) the time to drill the bore and/or the heat generated during the drilling operation.

After the bore is formed in the workpiece 124, the flapper 134 moves in the cavity 184 to strike the debris 126 on the back-side 124B of the workpiece 124. Within examples, the flapper 134 can move in the cavity 184 while removing the cutting element 144 from the bore in the workpiece 124. For instance, computing system 122 can be configured to actuate the pneumatic source 116 responsive to the cutting element 144 starting to retract in a direction from the back-side 124B to the front-side 124A. More generally, the computing system 122 can determine a position of the cutting element 144 of the end-effector 110 relative to the workpiece 124, and based on the determined position of the cutting element 144, the computing system 122 can actuate the pneumatic source 116 to move the flapper 134 within the cavity 184. In an example, the computing system 122 may determine the position of the cutting element 144 based on a signal, which is transmitted from the end-effector 110 to the computing system 122, indicating the position.

As described above, the pneumatic source 116 compresses a gas and the pneumatic conduit 136 transports the compressed gas to the pneumatic port 138. The pneumatic port 138 receives the compressed gas from the pneumatic conduit 136 at the inlet 192 and directs the compressed gas into the cavity 184 at the outlet 194. In particular, the outlet 194 of the pneumatic port 138 directs the compressed gas to an exterior surface of the flapper 134. The compressed gas thus provides a pneumatic force to the flapper 134, which causes the flapper 134 to rotate about the axis A2 from the first position to the second position. Rotating about the axis A2, the flapper 134 sweeps through a plane in the cavity 184, which is parallel to and offset by a distance from a plane of the distal end 166. While moving in the cavity 184, the flapper 134 contacts the debris 126 and thereby separates the debris 126 from the back-side 124B of the workpiece 124. Due, at least in part, to the position and orientation of the flapper 134 in the cavity 184, the flapper 134 does not contact the remainder of the back-side 124B of the workpiece and, thus, the risk of damage to the workpiece 124 by the flapper 134 is reduced or eliminated.

After separating from the workpiece 124, the debris 126 is sucked into the vacuum port 142 by the vacuum force applied to the cavity 184 by the vacuum source 118. Under the vacuum force, the debris 126 is transported by the vacuum conduit 140 from the vacuum port 142 to the storage container 120. The debris 126 is stored in the storage container 120. The vacuum source 118 can cease applying the vacuum force after the debris 126 is transported to the storage container 120.

Further, after the flapper 134 separates the debris 126 from the back-side 124B of the workpiece 124, the pneumatic source 116 ceases the pneumatic force on the flapper 134. Responsive to ceasing the pneumatic force, the biasing member 196 moves the flapper 134 from the second position back to the first position in the cavity 184.

After the bore is complete, the end-effector 110 can use the fastener inserter 130 to insert a fastener in the bore. Additionally, the end-effector 110 can couple a nut and/or collar to couple the fastener to the workpiece 124.

Responsive to the end-effector 110 completing operations on the workpiece 124, the actuator 132 can move the clamp-frame arm 162 relative to the clamp-frame bracket 160 to release the workpiece 124 from engagement with the clamp foot 114 and/or end-effector 110. The workpiece 124 can then be removed from the clamp assembly 100 and/or repositioned between the clamp foot 114 and the end-effector 110 to perform a further operation on the workpiece 124.

Figure 7:
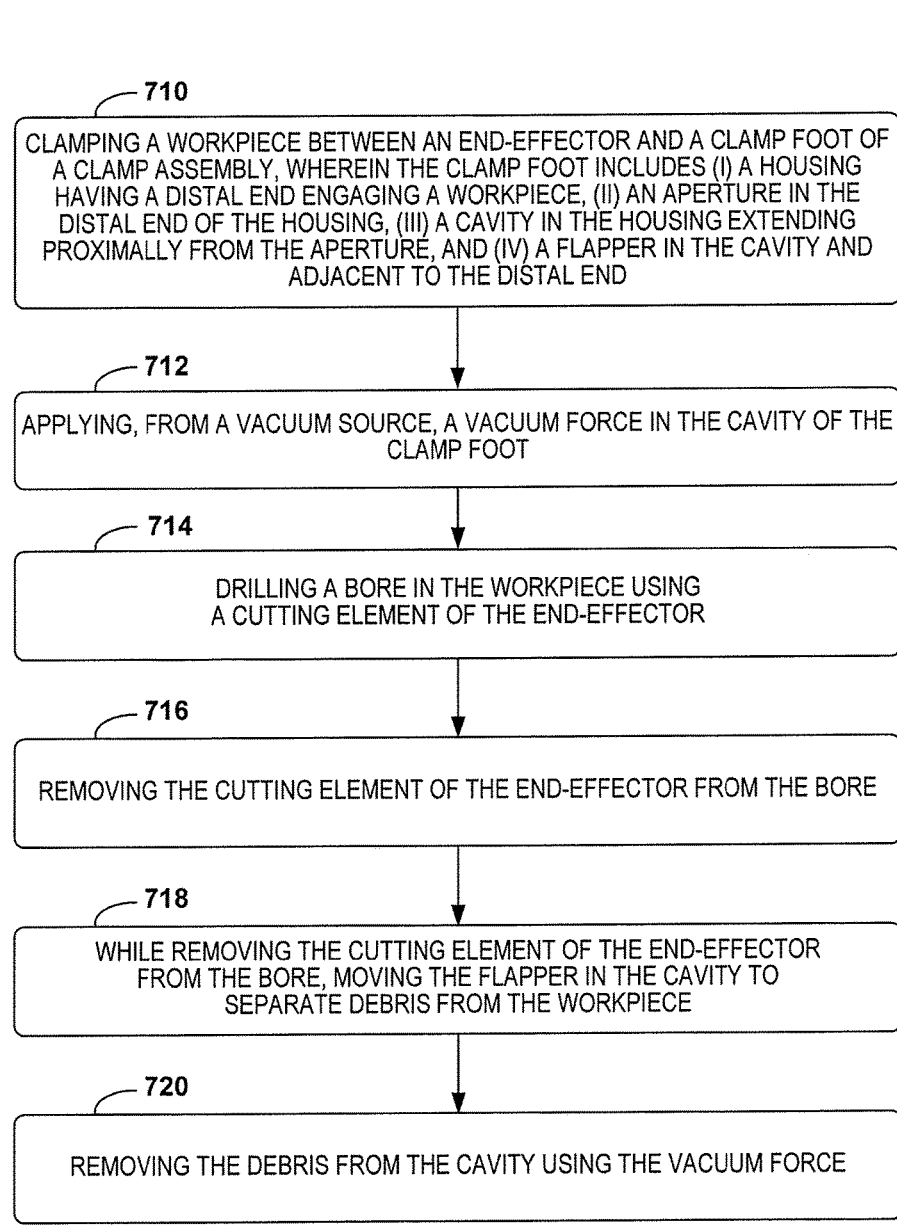
FIG. 7 depicts a flow chart of an example process for communication, according to an example embodiment.

Referring now to FIG. 7, a flow chart for a process 700 of operating on a workpiece is depicted according to an example embodiment. As shown in FIG. 7, the process 700 includes clamping a workpiece between an end-effector and a clamp foot of a clamp assembly at block 710. The clamp foot includes a housing having a distal end engaging the workpiece, an aperture in the distal end of the housing, a cavity in the housing extending proximally from the aperture, and a flapper in the cavity and adjacent to the distal end.

At block 712, the process 700 also includes applying, from a vacuum source, a vacuum force in the cavity of the clamp foot. At block 714, the process 700 includes drilling a bore in the workpiece using a cutting element of the end-effector. After drilling the bore, the process 700 includes removing the cutting element of the end-effector from the bore at block 716. At block 718, the process 700 further includes, while removing the cutting element of the end-effector from the bore, moving the flapper in the cavity to separate debris from the workpiece. At block 720, the process 700 includes removing the debris from the cavity using the vacuum force.

Figure 8:
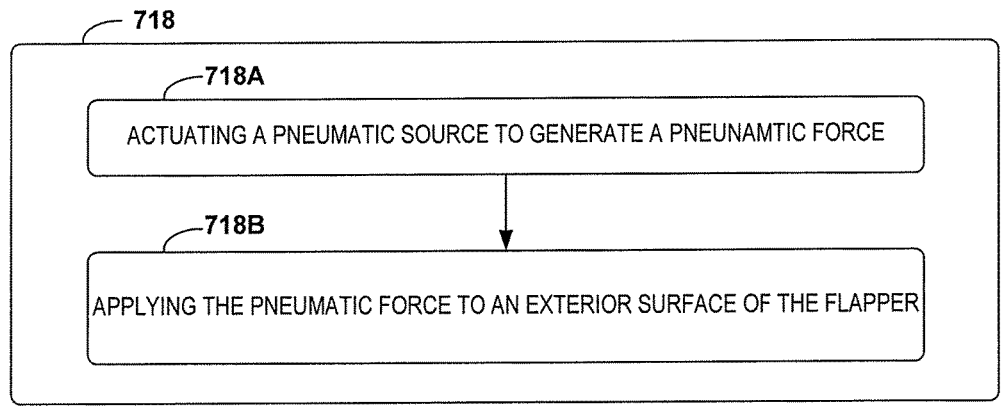
FIG. 8 depicts a flow chart of an example process for communication, according to an example embodiment.
Figure 9:
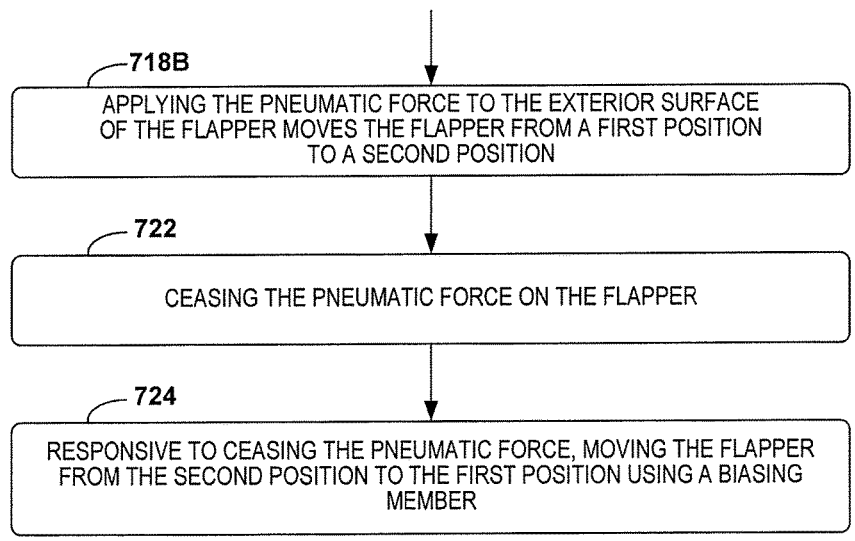
FIG. 9 depicts a flow chart of an example process for communication, according to an example embodiment.

FIGS. 8-12 depict additional aspects of the process 700 according to further examples. As shown in FIG. 8, at block 718, the process 700 can include moving the flapper in the cavity by actuating a pneumatic source to generate a pneumatic force at block 718A and applying the pneumatic force to an exterior surface of the flapper at block 718B. As shown in FIG. 9, applying the pneumatic force at block 718B can move the flapper from a first position to a second position. As further shown in FIG. 9, the process 700 can also include ceasing the pneumatic force on the flapper at block 722 and, responsive to ceasing the pneumatic force at block 722, moving the flapper from the second position to the first position using a biasing member at block 724.

Figure 10:
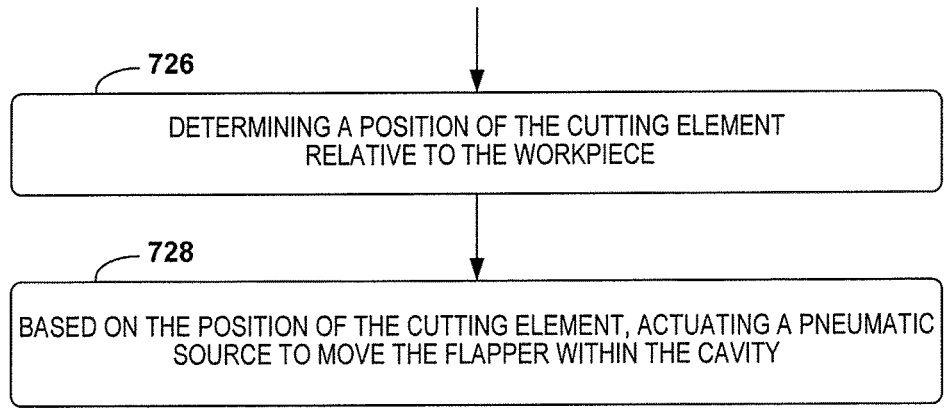
FIG. 10 depicts a flow chart of an example process for communication, according to an example embodiment.
Figure 11:
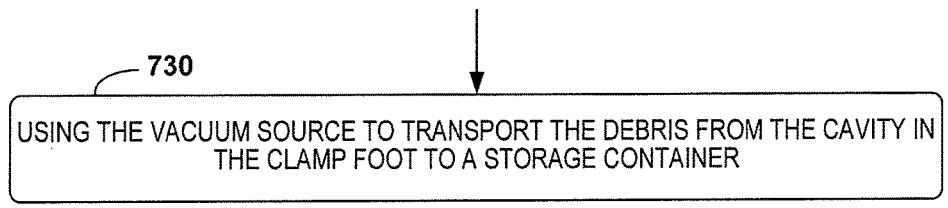
FIG. 11 depicts a flow chart of an example process for communication, according to an example embodiment.
Figure 12:
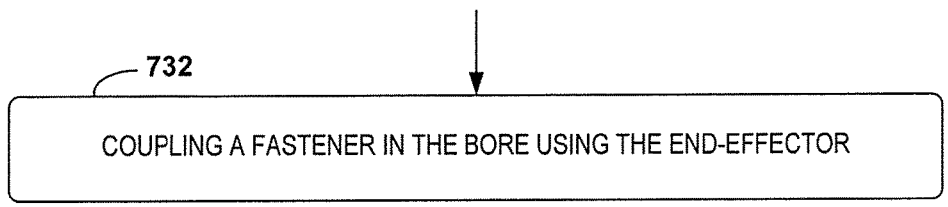
FIG. 12 depicts a simplified block diagram of a communication system according to another example embodiment.

As shown in FIG. 10, the process 700 can include determining a position of the cutting element of the end-effector at block 726 and, based on the position of the cutting element, actuating a pneumatic source to move the flapper within the cavity at block 728. As shown in FIG. 11, the process 700 can include, at block 730, using the vacuum source to transport the debris from the cavity in the clamp foot to a storage container. As shown in FIG. 12, the process 700 can include, at block 732, coupling a fastener in the bore using the end-effector.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Example aspects have been described above. After studying the configurations, examples, and arrangements described herein a skilled person may come to understand, however, that changes and modifications may be made without departing from the true scope and spirit of the disclosure. The description of the different advantageous aspects has been presented for purposes of illustration and description, and is not intended to be exhaustive or limited to the form disclosed. After reviewing this disclosure, many modifications and variations will become apparent to those of ordinary skill in the art. Further, different advantageous aspects may provide different advantages as compared to other advantageous aspects. The example aspects selected are chosen and described in order to explain the principles of the disclosure, the practical application, and to enable others of ordinary skill in the art to understand the disclosure with various modifications as are suited to the particular use contemplated.

What is claimed is:

1. A clamp foot for a clamp assembly, comprising:
   a housing having a distal end for engaging a workpiece;
   an aperture in the distal end of the housing;
   a cavity in the housing extending proximally from the aperture;
   a flapper in the cavity and adjacent to the distal end;
   a pneumatic port in the cavity configured to direct a pneumatic force from a pneumatic source to the flapper; and
   a vacuum port in the cavity for coupling the cavity to a vacuum source,
   wherein, responsive to the pneumatic force, the flapper is movable within the cavity to separate debris from the workpiece, and
   wherein the vacuum port is configured to remove from the cavity, via a vacuum force from the vacuum source, the debris separated from the workpiece by the flapper.

2. The clamp foot of claim 1, wherein the aperture has a first axis, and
   wherein the flapper is hingedly coupled to the housing such that the flapper is rotatable about a second axis that is substantially parallel to the first axis of the aperture.

3. The clamp foot of claim 1, wherein the flapper is proximally offset from the distal end by a distance of approximately 0.005 inches to approximately 0.030 inches.

4. The clamp foot of claim 1, wherein the pneumatic port includes an inlet for receiving a compressed gas from the pneumatic source and an outlet for providing the compressed gas to an exterior surface of the flapper, and
   wherein the outlet is oriented at an approximately 90 degree angle relative to the inlet.

5. The clamp foot of claim 1, further comprising a biasing member applying a biasing force to the flapper,
   wherein flapper is configured to move from a first position to a second position in response to the pneumatic force on the flapper, and
   wherein the biasing member is configured to return the flapper from the second position to the first position in response to a cessation of the pneumatic force on the flapper.

6. The clamp foot of claim 5, wherein the biasing member comprises a torsion spring, and
   wherein the torsion spring includes a coil, a first arm extending from the coil to engage the flapper, and a second arm extending from the coil to engage the housing.

7. The clamp foot of claim 1, wherein the housing comprises a cover portion removably coupled to a body portion, and
wherein the cover portion and the body portion define a plurality of side walls of the cavity.

8. A clamp assembly, comprising:
a clamp foot including:
a housing having a distal end for engaging a workpiece,
an aperture in the distal end of the housing,
a cavity in the housing extending proximally from the aperture,
a flapper in the cavity and adjacent to the distal end,
a pneumatic port in the cavity configured to direct a pneumatic force from a pneumatic source to the flapper, and
a vacuum port in the cavity for coupling the cavity to a vacuum source,
a clamp frame having a first end coupled to the clamp foot; and
an end-effector coupled to a second end of the clamp frame,
wherein the end-effector comprises a drill including a cutting element and the cutting element is aligned with the aperture in the clamp foot,
wherein, responsive to the pneumatic force, the flapper is movable within the cavity to separate debris from the workpiece, and
wherein the vacuum port is configured to remove from the cavity, via a vacuum force from the vacuum source, the debris separated from the workpiece by the flapper.

9. The clamp assembly of claim 8, wherein the clamp frame comprises:
a clamp-frame arm coupled to the clamp foot;
a clamp-frame bracket coupled to the clamp-frame arm and the end-effector; and
an actuator configured to move the clamp-frame arm relative to the clamp-frame bracket and thereby clamp the workpiece between the distal end of the clamp foot and the end-effector.

10. The clamp assembly of claim 8, further comprising a computing system configured to:
determine a position of the cutting element relative to the workpiece, and
based on the position of the cutting element, actuate the pneumatic source to move the flapper within the cavity.

11. The clamp assembly of claim 8, wherein the debris is a drill cap formed by the drill.

12. The clamp assembly of claim 8, wherein the end-effector is a multi-function end-effector configured to drill a bore in the workpiece and couple a fastener in the bore.

13. The clamp assembly of claim 8, further comprising:
the pneumatic source configured to compress a gas for generating the pneumatic force;
a pneumatic conduit coupling the pneumatic source to the pneumatic port, wherein the pneumatic conduit is configured to transport the compressed gas from the pneumatic source to the pneumatic port;
the vacuum source configured to generate the vacuum force; and
a vacuum conduit coupling the vacuum source to the vacuum port, wherein the vacuum conduit is configured to transport the debris from the vacuum port to a storage container.

14. A method comprising:
clamping a workpiece between an end-effector and a clamp foot of a clamp assembly, wherein the clamp foot comprises:
a housing having a distal end engaging the workpiece,
an aperture in the distal end of the housing,
a cavity in the housing extending proximally from the aperture, and
a flapper in the cavity and adjacent to the distal end;
applying, from a vacuum source, a vacuum force in the cavity of the clamp foot;
drilling a bore in the workpiece using a cutting element of the end-effector;
after drilling the bore, removing the cutting element of the end-effector from the bore;
while removing the cutting element of the end-effector from the bore, moving the flapper in the cavity to separate debris from the workpiece; and
removing the debris from the cavity using the vacuum force.

15. The method of claim 14, wherein moving the flapper in the cavity comprises:
actuating a pneumatic source to generate a pneumatic force; and
applying the pneumatic force to an exterior surface of the flapper.

16. The method of claim 15, wherein the aperture has a first axis, and
wherein applying the pneumatic force to the exterior surface of the flapper causes the flapper to rotate about a second axis that is substantially parallel to the first axis of the aperture.

17. The method of claim 15, wherein applying the pneumatic force to the exterior surface of the flapper moves the flapper from a first position to a second position, and wherein the method further comprises:
ceasing the pneumatic force on the flapper; and
responsive to ceasing the pneumatic force, moving the flapper from the second position to the first position using a biasing member.

18. The method of claim 14, wherein the end-effector comprises a drill having the cutting element, the cutting element is aligned with the aperture in the clamp foot, and moving the flapper comprises:
determining a position of the cutting element relative to the workpiece, and
based on the position of the cutting element, actuating a pneumatic source to move the flapper within the cavity.

19. The method of claim 14, using the vacuum source to transport the debris from the cavity in the clamp foot to a storage container.

20. The method of claim 14, further comprising coupling a fastener in the bore using the end-effector.

* * * * *